(12) United States Patent
Agata et al.

(10) Patent No.: US 6,993,626 B2
(45) Date of Patent: Jan. 31, 2006

(54) APPARATUS AND METHOD FOR PROCESSING INFORMATION, AND PROGRAM AND MEDIUM USED THEREFOR

(75) Inventors: Hideyuki Agata, Tokyo (JP); Masakazu Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 09/845,994

(22) Filed: Apr. 30, 2001

(65) Prior Publication Data

US 2002/0004874 A1   Jan. 10, 2002

(30) Foreign Application Priority Data

May 1, 2000  (JP) ............................. 2000-132722

(51) Int. Cl.
*G06F 12/00*   (2006.01)

(52) U.S. Cl. ...................... 711/115; 711/154
(58) Field of Classification Search ................ 711/1, 711/115, 154
See application file for complete search history.

(56) References Cited

U.S. PATENT DOCUMENTS

| 5,359,703 | A | | 10/1994 | Robertson et al. |
| 5,485,439 | A | * | 1/1996 | Hamasaka et al. ....... 369/47.36 |
| 5,711,672 | A | * | 1/1998 | Redford et al. ......... 434/307 R |
| 5,917,488 | A | | 6/1999 | Anderson et al. |
| 5,936,638 | A | | 8/1999 | Hodgins et al. |
| 6,067,398 | A | * | 5/2000 | Sato .............. 386/46 |
| 6,097,389 | A | | 8/2000 | Morris et al. |
| 6,118,427 | A | | 9/2000 | Buxton et al. |
| 6,160,553 | A | | 12/2000 | Robertson et al. |
| 6,208,348 | B1 | | 3/2001 | Kaye .......................... 345/419 |
| 6,236,395 | B1 | | 5/2001 | Sezan et al. ................ 345/723 |
| 6,249,281 | B1 | | 6/2001 | Chen et al. |
| 6,253,218 | B1 | | 6/2001 | Aoki et al. |
| 6,333,752 | B1 | | 12/2001 | Hasegawa et al. |
| 6,335,742 | B1 | | 1/2002 | Takemoto |
| 6,335,746 | B1 | | 1/2002 | Enokida et al. |
| 6,405,362 | B1 | * | 6/2002 | Shih et al. ............... 717/174 |
| 6,496,206 | B1 | * | 12/2002 | Mernyk et al. ........... 715/835 |
| 6,636,243 | B1 | | 10/2003 | MacPhail |
| 2002/0032696 | A1 | | 3/2002 | Takiguchi et al. |

FOREIGN PATENT DOCUMENTS

| EP | 1 006 477 | 6/2000 |
| EP | 1 148 412 | 10/2001 |
| WO | WO 99 37075 | 7/1999 |

OTHER PUBLICATIONS

Bott, Using Windows 95, QUE, 1995.*

* cited by examiner

Primary Examiner—B. James Peikari
Assistant Examiner—Woo H. Choi
(74) *Attorney, Agent, or Firm*—Frommer Lawrence & Haug LLP; William S. Frommer

(57) ABSTRACT

Disclosed is an information processing apparatus which ends application programs when a recording medium is pulled out. In step S1, it is determined whether or not a Memory Stick is loaded in a Memory Stick slot. If a Memory Stick is found loaded, the procedure goes to step S2. In step S2, a display program and a reading program are started. In step S3, it is determined whether or not the loaded Memory Stick is being accessed. If the loaded Memory Stick is found being accessed, then, in step S4, the Memory Stick is locked. In step S6, if the Memory Stick is found pulled out, then, in step S7, the display program and the reading program are ended.

5 Claims, 9 Drawing Sheets

APPARATUS AND METHOD FOR PROCESSING INFORMATION, AND PROGRAM AND MEDIUM USED THEREFOR

BACKGROUND OF THE INVENTION

The present invention relates to an apparatus and a method for processing information, and a program and a program storage medium used therefor, and more particularly to an apparatus and a method for processing information, and a program and a program storage medium used therefor, for example, suitably for use in controlling the timing of starting or ending a predetermined application program.

Some of the prior art personal computers automatically start an application program for processing data stored in a predetermined detachable recording medium when it is loaded in those personal computers.

Conversely, if an application program under execution can be automatically ended when a predetermined detachable recording medium is pulled out of a personal computer, it would significantly enhance user convenience. However, the applicant is unaware of the existence of any such technologies.

If the above-mentioned recording apparatus is pulled out of a personal computer while the above-mentioned application program is accessing the recording medium to read or write data, an error may occur during the execution of the application program or the data stored in the recording medium may be destroyed.

SUMMARY OF THE INVENTION

It is therefore an object of the present invention to enhance user convenience by starting or ending a predetermined application program in response to the attachment or detachment of a recording medium to or from a personal computer.

A first aspect of the present invention, there is provided an information processing apparatus for reading data from a detachable predetermined recording medium, including unloading detection means for detecting the unloading of the recording medium from the information processing apparatus; and ending means for ending, in response to the unloading of the recording medium detected by the unloading detection means, an application program started to process the data read from the recording medium.

Preferably, the information processing apparatus may further include loading detection means for detecting the loading of the recording medium; and starting means for starting, in response to the loading of the recording medium detected by the loading detection means, the application program for processing the data recorded on the recording medium.

Preferably, the information processing apparatus may further include detection means for detecting access to the recording medium, and restriction means for restricting the unloading of the recording medium in response to a detection result provided by the detection means.

Preferably, the above-mentioned recording medium may be a semiconductor memory.

According to a second aspect of the present invention, there is provided an information processing method for an information processing apparatus for reading data from a detachable predetermined recording medium, including an unloading detection step for detecting the unloading of the recording medium from the information processing apparatus; and an ending step for ending, in response to the unloading of the recording medium detected in the unloading detection step, an application program started to process the data read from the recording medium.

According to a third aspect of the present invention, there is provided a computer-readable program for processing information for reading data from a detachable predetermined recording medium, including an unloading detection step for detecting the unloading of the recording medium; and an ending step for ending, in response to the unloading of the recording medium detected in the unloading detection step, an application program started to process the data read from the recording medium.

According to a fourth aspect of the present invention, there is provided a program storage medium for storing a computer-readable program for processing information for reading data from a detachable predetermined recording medium, said program including an unloading detection step for detecting the unloading of the recording medium from the information processing apparatus; and an ending step for ending, in response to the unloading of the recording medium detected in the unloading detection step, an application program started to process the data read from the recording medium.

According to a fifth aspect of the present invention, there is provided an information processing apparatus for communicating data via a network, including communication means for communicating data via the network; detection means for detecting a disconnection from the network; and ending means for ending, in response to the disconnection detected by the detection means, an application program started for processing the data received by the communication means via the network.

According to a sixth aspect of the present invention, there is provided an information processing method including a communication step for communicating data via a network; a detection step for detecting a disconnection from the network; and an ending step for ending, in response to the disconnection detected in the detection step, an application program started for processing the data received in the communication step via the network.

According to a seventh aspect of the present invention, there is provided a computer-readable program for processing information for communicating data via a network, including a communication step for communicating data via the network; a detection step for detecting a disconnection from the network; and an ending step for ending, in response to the disconnection detected in the detection step, an application program started for processing the data received in the communication step via the network.

According to an eighth aspect of the present invention, there is provided a program storage medium for storing a computer-readable program for communicating data via a network, including a communication step for communicating data via said network; a detection step for detecting a disconnection from the network; and an ending step for ending, in response to the disconnection detected in the detection step, an application program started for processing the data received in the communication step via the network.

As described and according to the present invention, the former apparatus and method for processing information and the former program and program storage medium end an application program started to process the data recorded on a recording medium when the unloading of the recording medium from the personal computer is detected, thereby enhancing user convenience.

As described and according to the present invention, the latter apparatus and method for processing information and the latter program and program storage medium end an application program started to process the data received via a network when the disconnection from the network is detected, thereby enhancing user convenience.

DETAILED DESCRIPTION OF THE PREFERRED EMBODIMENT

Figure 1:
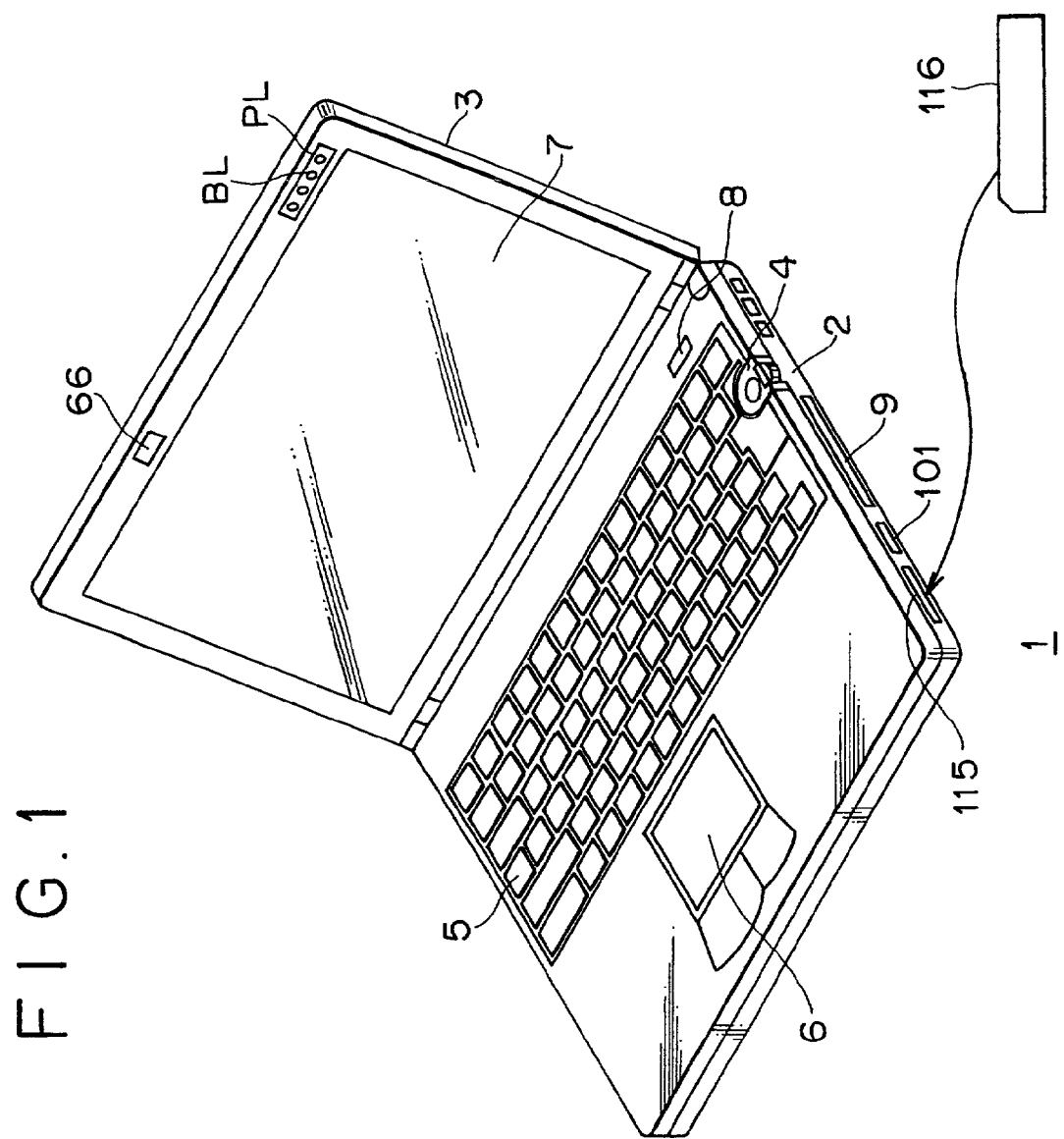
FIG. 1 is an external view illustrating the personal computer 1 to which the present invention is applied.
Figure 2:
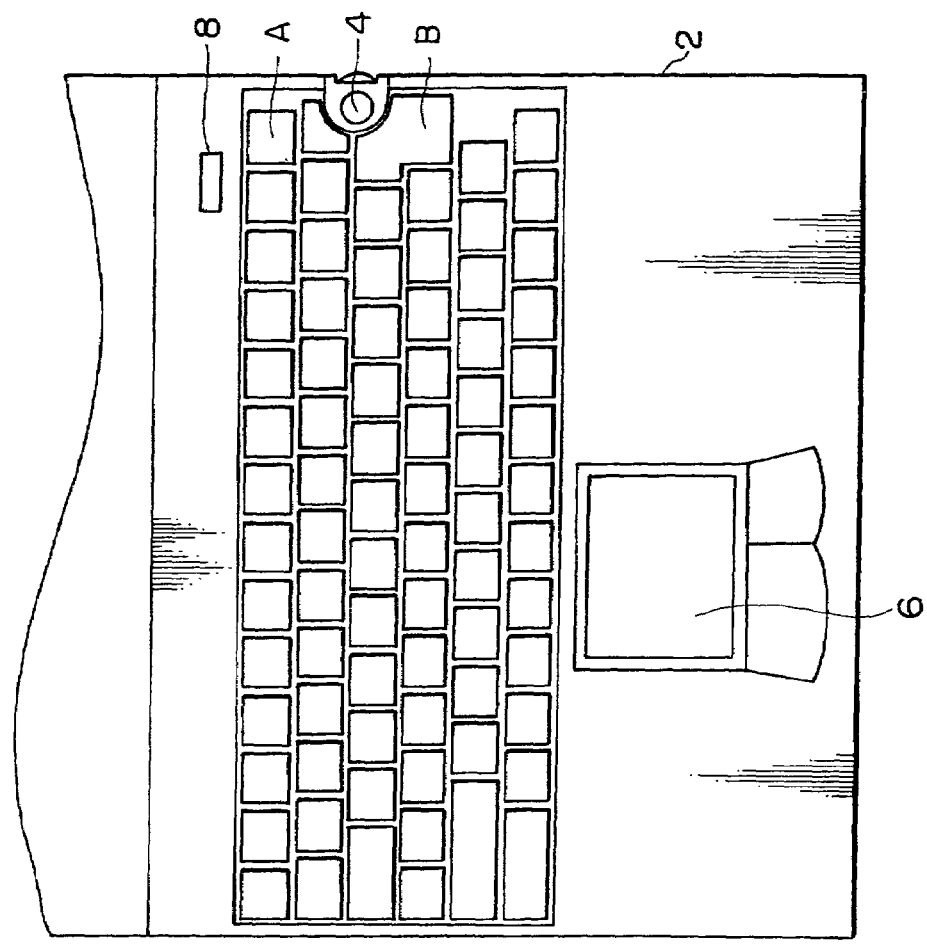
FIG. 2 is a top view illustrating the main body 2 of the personal computer 1.
Figure 3:
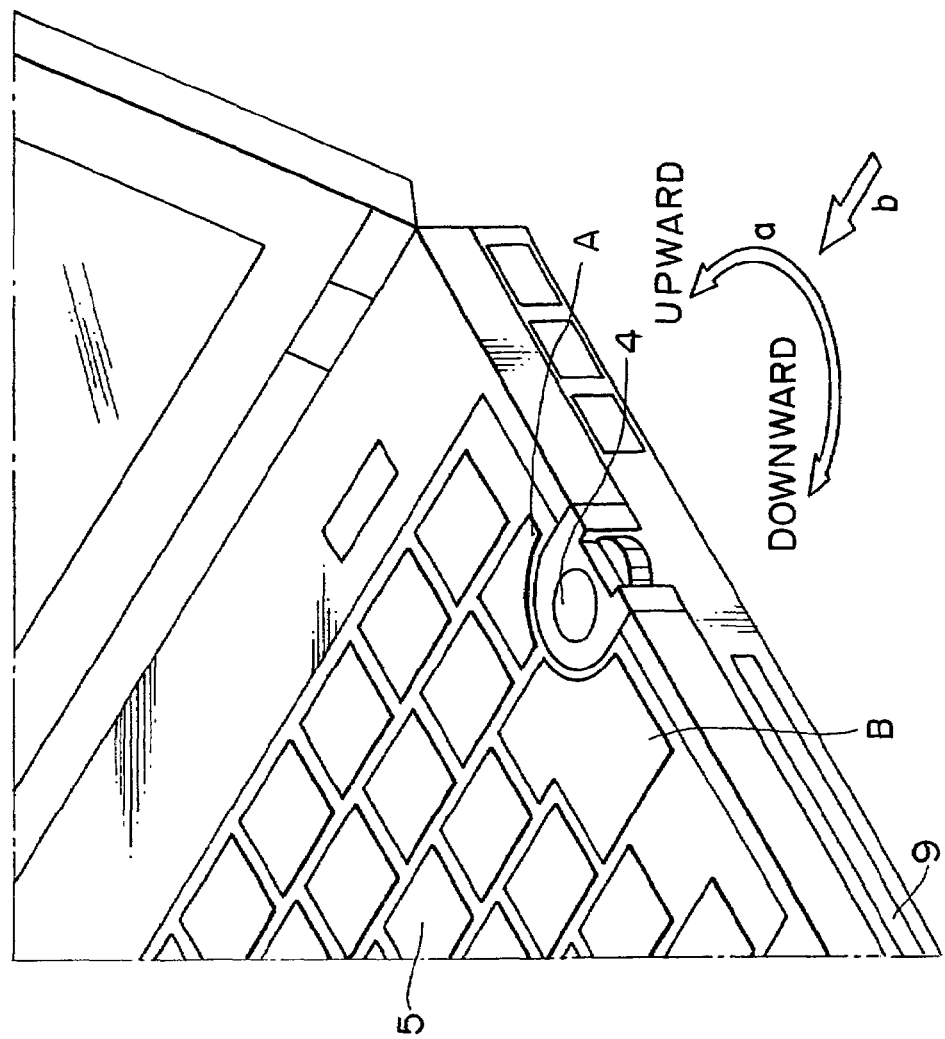
FIG. 3 is an enlarged perspective view illustrating the jog dial 4 arranged on the main body 2 of the personal computer 1.
Figure 4:
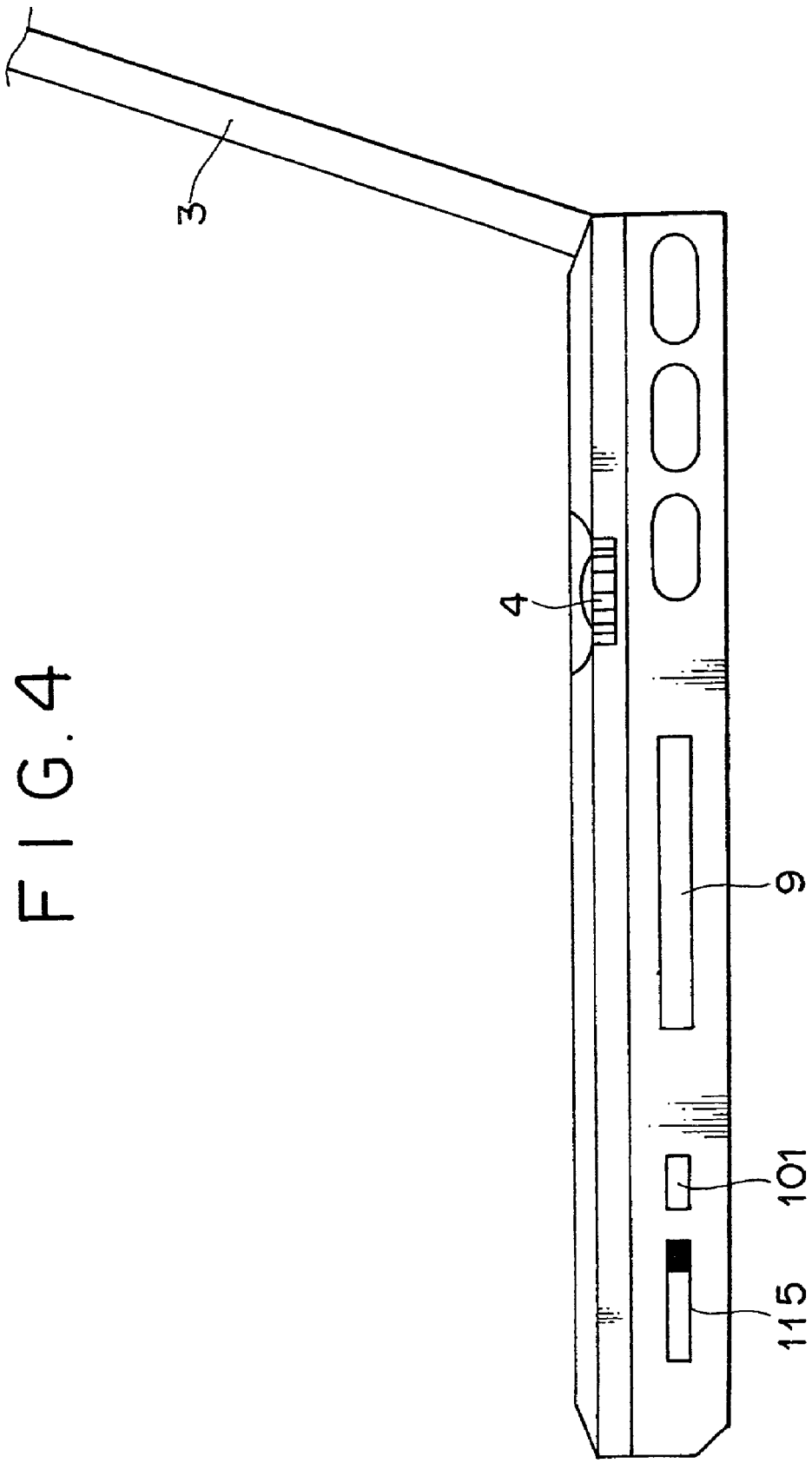
FIG. 4 is a side view illustrating the personal computer 1.

FIGS. 1 to 4 show external views of a note-size personal computer practiced as one embodiment of the present invention. A personal computer 1 is basically composed of a main body 2 and a display section 3 pivotally attached to the main body 2. FIG. 1 is an external perspective view of the personal computer 1 with the display section 3 open relative to the main body 2. FIG. 2 is a top view of the main body 2. FIG. 3 is an enlarged view of a jog dial 4 (to be described later) arranged on the main body 2. FIG. 4 is a side view of the jog dial 4 arranged on the main body 2.

The main body 2 is arranged, on its top side, with a keyboard 5 which is operated to enter various characters and symbols, a touch pad 6, which is a point device for use in moving a pointer (or a mouse cursor) displayed on an LCD 7 of the display section 3, and a power switch 8. On one side of the main body 2, the jog dial 4, a slot 9, an IEEE 1394 port 101, a Memory Stick slot 11, etc. are arranged. It is practical to arrange a stick-type pointing device instead of the touch pad 6.

On the front surface of the display section 3, the LCD 7 for displaying images is arranged. In the upper right corner of the display section 3, such LED lights as a power light PL, a battery light BL, and, as required, a message light (not shown) are arranged. A microphone 66 is arranged at the upper edge of the display 3.

The power light PL, the battery light BL, and the message light ML may be arranged at the lower edge of the display 3.

The jog dial 4 is mounted so that it comes between key A and key B arranged on the right side of the keyboard 5 shown in FIG. 2 of the main body 2, the top surface of the jog dial 4 being approximately flush with the fop surfaces of these keys. The jog dial 4 is operated in the direction indicated by arrow "a" shown in FIG. 3 to execute a predetermined process (for example, a display screen scrolling process) and in the direction indicated by arrow "b" to execute another predetermined process (for example, an icon selection enter process).

The jog dial 4 may be arranged on the left side of the main body 2. The jog dial 4 may also be arranged on the left or right face of the display 3 with the LCD 7 arranged or vertically between G key and H Key of the keyboard 5 (so that the jog dial 4 is rotatable in the directions parallel to Y key and B key).

The jog dial 4 may be arranged in a central portion of the front face of the main body 2 so that the user can operate the jog dial 4 with the thumb while operating the touch pad with the first finger. The jog dial 4 may also be arranged horizontally along the upper rim or the lower rim of the touch pad 6 or vertically between the left and right buttons of the touch pad 6. The jog dial 4 may also be arranged not vertically or horizontally but diagonally at whose angle it is easy for the operator to rotate the jog dial 4. The jog dial 4 may be arranged at the side of the mouse, a pointing device, at which the user can operate the jog dial 4 with the belly of the thumb.

For the jog dial 4, a rotary electronic device with a push switch disclosed in Japanese Patent Laid-open No. Hei 8(1996)-203387 for example may be employed.

The slot 9 accommodates a PC card, which is an extension card compliant with PCMCIA (Personal Computer Memory Card International Association).

The IEEE (Institute of Electrical and Electronics Engineers) 1394 port 101 has a construction compliant with the IEEE 1394 standard and is connected to a cable compliant with the IEEE 1394 standard.

The Memory Stick slot 115 accommodates a Memory Stick (trade mark) based on a semiconductor memory such as a flash memory which stores still picture, moving picture, audio, or text data. The Memory Stick 116 is detachably accommodated in the Memory Stick slot 115.

Figure 5:
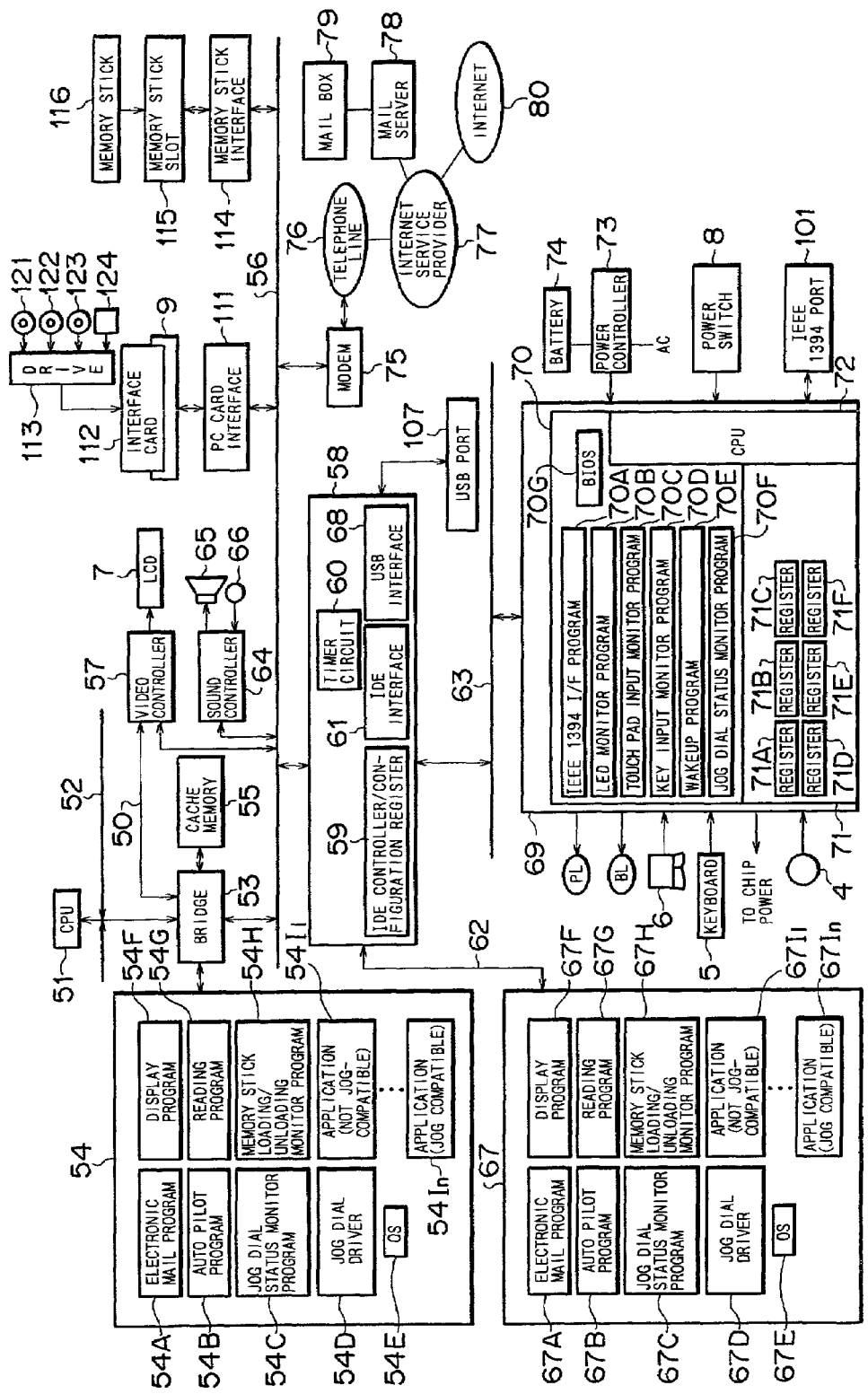
FIG. 5 is a block diagram illustrating the electrical configuration of the personal computer 1.

The following describes the electrical configuration of one embodiment of the personal computer 1 with reference to FIG. 5.

A central processing unit (hereafter a CPU) 51 is a Pentium (trade mark) processor of Intel Corporation for example and is connected to a host bus 52. The host bus 52 is connected to a bridge 53 (a so-called north bridge). The bridge 53 has an AGP (Accelerated Graphics Port) 50 and is connected to a PCI (Peripheral Component Interconnect/Interface) bus 56.

The bridge 53 is the 400BX, which is the AGP host bridge controller of Intel Corporation, for example, and controls the data transmission associated with the CPU 51 and a RAM (Random Access Memory) 54 (a so-called main memory). In addition, the bridge 53 controls the transmission of data with a video controller 57 via the AGP 50. It should be noted that the bridge 53 and a bridge (a so-called south bridge (PCI-ISA Bridge)) 58 constitute a so-called chipset.

The bridge 53 is also connected to a cache memory 55. The cache memory 55 is based on a memory chip which is faster in access than the RAM 54 based on an SRAM (Static RAM), thereby caching (namely temporarily storing) the programs and data to be used by the CPU 51.

It should be noted that the CPU 51 incorporates a primary cache memory (which operates faster than the cache memory 55 and is controlled by the CPU 51 itself).

The RAM 54, based on a DRAM (Dynamic RAM) for example, stores the programs to be executed by the CPU 51 and the data necessary for the CPU 51 to operate. To be more specific, the RAM 54 stores, upon completion of a boot-up sequence of the personal computer 1, an electronic mail program 54A, an auto pilot program 54B, a jog dial status monitor program 54C, a jog dial driver 54D, an operating system (OS) 54E, a display program 54F, a reading program 54G, a Memory Stick loading/unloading monitor program 54H and other application programs $54I_1$ to $54I_n$ (if it is not necessary to make distinction between the application programs $54I_1$ to $54I_n$, they will be generically referred to an application program 54I) loaded from a HDD (Hard Disk Drive) 67.

The electronic mail program 54A transfers communication text (so-called e-mail) over a communication line such as a telephone line via a modem 75. The electronic mail program 54A has a incoming mail capture capability. This incoming mail capture capability checks to see if a mail addressed to the user has terminated or not in a mail box 79 of a mail server 78 of an Internet service provider 77 and, if such a mail is found, executes a mail capture process.

The auto pilot program 54B sequentially starts plural predetermined processes (or programs) in a predetermined order.

The jog dial status monitor program 54C receives the information from each of the above-mentioned application programs 54I indicative of whether it complies with the jog dial 4. If the compliance is found, this program displays on the LCD 7 what can be done by operating the jog dial 4.

The jog dial status monitor program 54C detects a jog dial 4 event (the rotation in the direction of arrow "a" or the pressing in the direction of arrow "b" for example) and executes a process corresponding to the detected event. The jog dial status monitor program 54C has a list for receiving the notifications from application programs 54I. The jog dial driver 54D executes various capabilities in accordance with the operations of the jog dial 4.

The OS (Operating System) 54E is a program, typically Windows 95 (trade mark) or Windows 98 (trade mark) of Microsoft Corporation or Mac OS (trademark) of Apple Computer, Inc. for example, which controls the basic operations of the computer.

The display program 54F displays on the LCD 7 a thumbnail corresponding to a file (storing data such as moving picture, still picture, audio, or text (hereafter also referred to as content) stored in the Memory Stick 116 loaded in the Memory Stick slot 115.

The reading program 54G reads a file from the Memory Stick 116 loaded in the Memory Stick slot 115 and supplies the data stored in the file to the display program 54F.

The Memory Stick loading/unloading monitor program 54H monitors the loading or unloading of the Memory Stick 116 on the Memory Stick slot 115. Upon detection of the loading of the Memory Stick 116, this program starts the display program 54F and the reading program 54G. Also, upon detection of the unloading of the Memory Stick 116, the Memory Stick loading/unloading monitor program 54H ends the started display program 54F and the reading program 54G. The details of the Memory Stick loading/unloading monitor program 54H will be describe later with reference to the flowchart shown in FIG. 8.

The video controller 57 is connected to the bridge 53 via the AGP 50 and receives data (image data or text data for example) from the CPU 51 via the AGP 50 and the bridge 53 to generate the image data corresponding to the received data or stores the received data without change into an incorporated video memory. The video controller 57 displays on the LCD 7 of the display section 3 an image corresponding to the image data stored in the video memory.

The PCI bus is connected to a sound controller 64. The sound controller 64 captures a signal representing a voice inputted from the microphone 66, generates a corresponding audio data, and outputs the audio data to the RAM 54. Also, the sound controller 64 drives a speaker 65 to sound audio data therefrom.

The PCI bus 56 also connected to a modem 75, a PC card interface 111, and a Memory Stick interface 114.

The modem 75 sends predetermined data to a communication network such as the Internet or the mail server 78 via a public telephone line 76 and the Internet service provider 77 and receives predetermined data from the communication network 80 or the mail server 78.

The PC card interface 111 supplies the data supplied from an interface card 112 loaded in the slot 9 to the CPU 51 or the RAM 54 and outputs the data supplied from the CPU 51 to the interface card 112. The drive 113 is connected to the PCI bus 56 via the PC card interface 111 and the interface card 112.

The drive 113 reads data from a magnetic disc 121, an optical disc 122, a magneto-optical disc 123, or a semiconductor memory 124 loaded in the drive 113 and supplies the data to the RAM 54 via the PC card interface 111, the interface card 112, and the PCI bus 56.

The Memory Stick interface 114 supplies the data supplied from the Memory Stick 116 loaded in the Memory Stick slot 115 to the CPU 51 or the RAM 54 and outputs the data supplied from the CPU 51 to the Memory Stick 116.

The PCI bus is also connected to the bridge 58 (a so-called south bridge). The bridge 58 is based on the PIIX4 of Intel Corporation for example and incorporates an IDE (Integrated Drive Electronics) controller/configuration register 59, a timer circuit 60, an IDE interface 61, and a USB (Universal Serial Bus) interface 68. The bridge 58 controls various I/O (Input/Output) operations such as control of a device connected to the IDE bus 62 or connected via an ISA/EIO (Industry Standard Architecture/Extended Input Output) bus 63 or an I/O interface 69.

The IDE controller/configuration register 59 is composed of a so-called primary IDE controller and a so-called secondary controller and a configuration register (each not shown).

The primary IDE controller of the IDE controller/configuration register 59 is connected to the HDD 67 via the IDE bus 62. The secondary IDE controller is electrically connected to so-called IDE devices such as a CD-ROM driver or a HDD both not shown when these IDE devices are connected to another IDE bus.

The HDD 67 stores an electronic mail program 67A, an auto pilot program 67B, a jog dial status monitor program 67C, a jog dial driver 67D, an OS 67E, application programs such as a display program 67F and a reading program 67G, a Memory Stick loading/unloading monitor program 67H, and others $67I_1$ to $67I_n$. The electronic mail program 67A, the auto pilot program 67B, the jog dial status monitor program 67C, the jog dial driver 67D, the OS 67E, the display program 67F and the reading program 67G, the Memory Stick loading/unloading monitor program 67H and others $67I_1$ to $67I_n$ stored in the HDD 67 are sequentially supplied and loaded into the RAM 54 in a starting (boot-up) sequence for example.

The USB interface 68 sends data to a device connected via a USB port 107 and receives data from the device.

The timer circuit 60 supplies the data indicative of current time upon request by the display program 67F to the CPU 51 via the PCI bus 56. Referring to the current time data supplied from the timer circuit 60, the display program 67F can know an elapsed time for example.

The ISA/EIO bus 63 is also connected to the I/O interface 69. In the I/O interface 69, constituted by an embedded controller, a ROM 70, a RAM 71, and a CPU 72 are interconnected.

The ROM 70 stores an IEEE 1394 interface program 70A, a LED control program 70B, a touch pad input monitor program 70C, a key input monitor program 70D, a wakeup program 70E, and a jog dial status monitor program 70F.

The IEEE 1394 interface program 70A communicates via the IEEE 1394 port 101 data (the data stored in packet) compliant with the IEEE 1394 standard with external devices (not shown) connected to the IEEE 1394 port 101. The LED control program 70B controls the turn-on/off of the power light PL, the battery light BL, the message light ML as required, and other LED lights. The touch pad input monitor program 70C monitors the input made by the user from the touch pad 6.

The key input monitor program 70D monitors the input made by the user from the keyboard 5 or other key switches. The wakeup program 70E, which executes power management on each chipset constituting the personal computer 1, checks, on the basis of the current time data supplied from the timer circuit 60 of the bridge 58, whether or not a predetermined time has been reached and, when the predetermined has been found reached, starts a predetermined process (or a program). The jog dial status monitor program 70F always monitors whether or not the rotary encoder of the jog dial has been operated, or, whether or not the jog dial 4 itself has been pushed.

The ROM 70 also stores a BIOS (Basic Input/Output System) 70G. The BIOS 70G controls data transfer (input/output) between the OS or application programs 54A to 54F and peripheral devices (the touch pad 6, the keyboard 5, the HDD 67, etc.).

The RAM 71 stores registers 71A to 71F, namely a LED control register, a touch pad input status register, a key input status register, a setting time register, a jog dial status monitor I/O register, and an IEEE 1394 I/F register. For example, the LED control register holds a predetermine value when the jog dial 4 is pressed to start the electronic mail program 54A, thereby controlling the turn-on of the message light ML in accordance with the stored value. The key input status register holds a predetermined operated key flag when the jog dial 4 is pressed. The setting time register holds a predetermined time when the user operates the keyboard 5 for example.

The I/O interface 69 is connected to the jog dial 4, the touch pad 6, the keyboard 5, and the IEEE 1394 port 101 through the corresponding connectors not shown, and outputs the signals corresponding to the operations made on these input devices to the ISA/EIO bus 63. Also, the I/O interface 69 controls the transfer of data with the external devices connected via the IEEE 1394 port 101. The I/O interface 69 is also connected to the power light PL, the battery light BL, the message light ML, a power control circuit 73, and other LED lights.

The power control circuit 73, connected to an incorporated battery 74 or an AC power outlet, supplies power to each blocks constituting the personal computer and controls the charging of the incorporated battery 74 and a second battery of each peripheral device. The I/O interface 69 monitors the power switch 8 which turns on/off the power to the personal computer.

The I/O interface 69 executes the programs, the IEEE 1394 interface program 70A through the jog dial status monitor program 70F, on the internally supplied power if the power switch 8 is off. Namely, the programs, the IEEE 1394 interface program 70A through the jog dial status monitor program 70F, are always operating.

Therefore, if the power switch 8 is off, namely the CPU 51 is not executing the OS 54E, the I/O interface 69 executes the jog dial status monitor program 70F, so that, when the jog dial 4 is pressed in the power save mode or with the power being off, the personal computer 1 starts the processing of a predetermined software program or script file.

Figure 6:
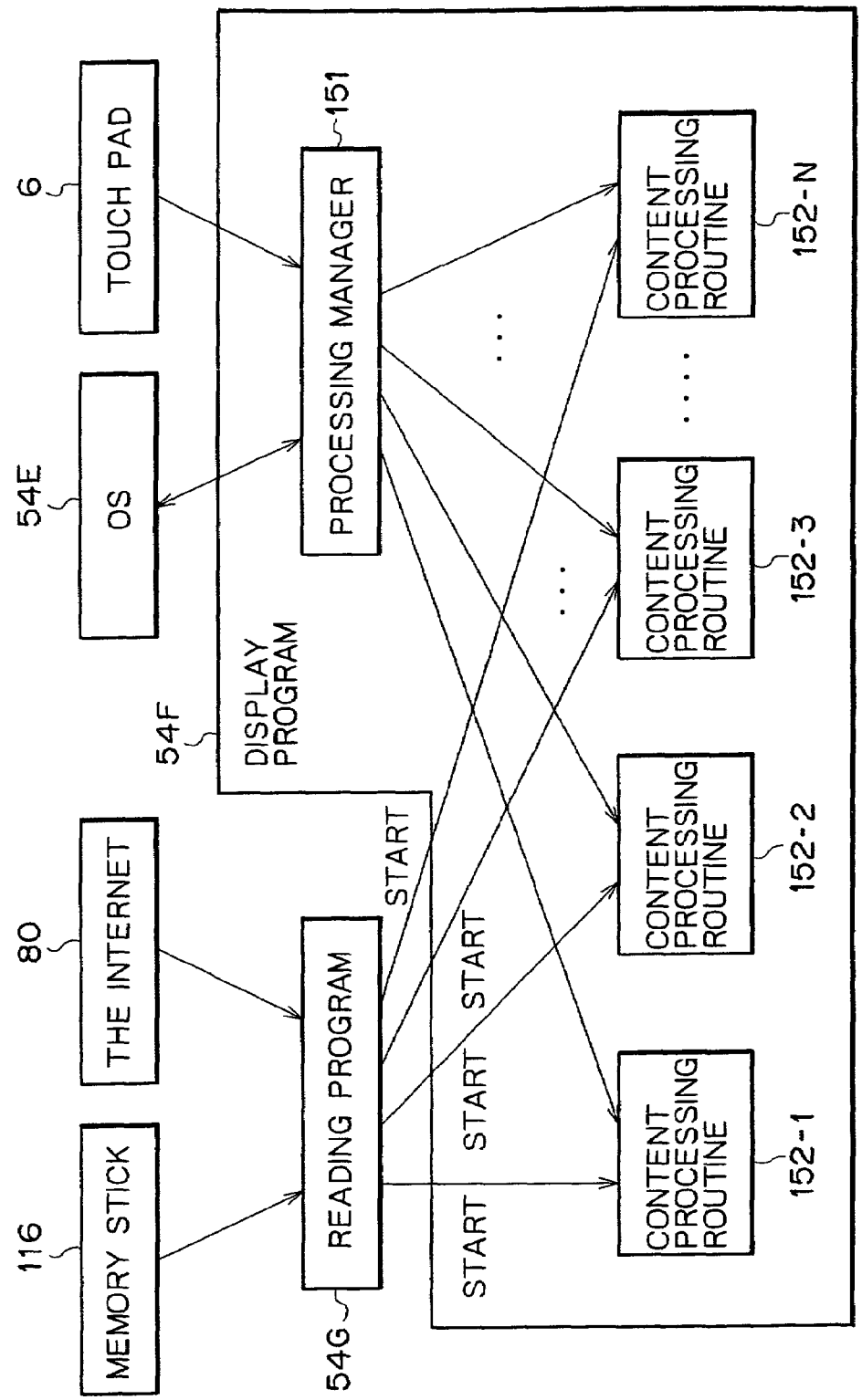
FIG. 6 is a diagram illustrating the processing by the OS 54E, the display program 54F, and the reading program 54G.

FIG. 6 shows the configurations of the display program 54F and the reading program 54G to be executed by the personal computer 1. The display program 54F and the reading program 54G are executed when a command is inputted by the user or comes from the Memory Stick loading/unloading monitor program 54H which has detected the loading of the Memory Stick 116.

The display program 54F includes a processing manager 151, content processing routines 152-1 to 152-N.

The processing manager 151 computes, on the basis of an input event supplied from the touch pad 6 or the OS 54E, a position at which a thumbnail corresponding to a file read from the Memory Stick 116 is to be displayed and supplies a computation result to the content processing routines 152-1 to 152-N. The thumbnail display position to be supplied to the content processing routines 152-1 to 152-N includes a depth (indicative of a virtual distance from the surface of the LCD 7, determining, when two or more thumbnails overlap, which one is to be displayed on top and the size of the displayed thumbnail for example) in addition to a horizontally and vertically defined position on the LCD 7.

On the basis of the an input event for example supplied from the touch pad 6 or the OS 54E, the processing manager 151 indicates the display state to the content processing routines 152-1 to 152-N.

In response to a request from the reading program 54G, the content processing routines 152-1 to 152-N are started in the number corresponding to the number of files read from the Memory Stick 116.

For example, when four files have been read by the reading program 54G from the Memory Stick 116, the reading program 54G requests the starting of the content processing routines 152-1 to 152-4. For example again, if 8 files have been read by the reading program 54G from the Memory Stick 116, the reading program 54G requests the starting of the content processing routines 152-1 to 152-8.

Thus, the number of content processing routines 152-1 to 152-N corresponding to the number of files read by the reading program 54G from the Memory Stick 116 are started. Actually, the display program 54F repeats the execution of one routine by a predetermined number of times specified by the reading program 54G. Therefore, it appears that plural content processing routines 152-1 to 152-N are running.

The content processing routine 152-1 displays one thumbnail corresponding to one file read from the Memory Stick 116 onto the LCD 7 by the reading program 54G. Likewise, the content processing routine 152-2 to 152-N each display one thumbnail corresponding to one file read from the Memory Stick 116 onto the LCD 7 by the reading program 54G.

Reading one file from the Memory Stick 116, the reading program 54G starts one of the content processing routines 152-1 to 152-N to supply the data stored in the read file.

Also, reading a file from the communication network 8 such as the Internet, the reading program 54G starts one of the content processing routines 152-1 to 152-N to supply the data stored in the read file.

If the content processing routines 152-1 to 152-N need not be distinguished between, they are simply referred to as a content processing routine 152.

Figure 7:
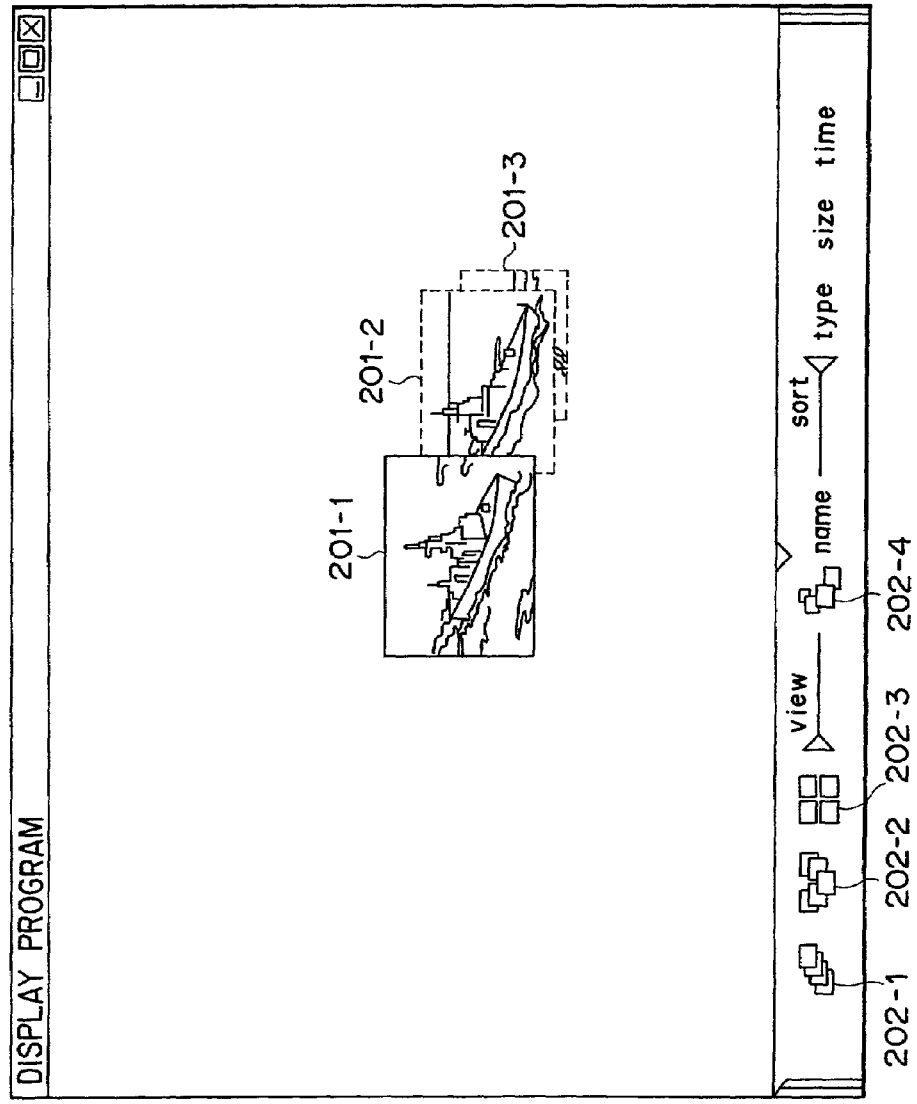
FIG. 7 is an exemplary view illustrating a display screen to be displayed by the display program 54F onto the LCD 7.

The following describes a screen to be displayed by the display program 54F onto the LCD 7 with reference to FIG. 7. FIG. 7 shows an exemplary screen to be displayed by the display program 54F onto the LCD 7 when the reading program 54G reads 3 files from the Memory Stick 116 after the display program 54F has been started.

A thumbnail 201-1 is constituted by an image which corresponds to the data stored in the file read first from the Memory Stick 116 by the reading program 54G. A thumbnail 201-1 is constituted by an image which corresponds to the data stored in the file read second from the Memory Stick 116 by the reading program 54G. A thumbnail 201-3 is constituted by an image which corresponds to the data stored in the file read third from the Memory Stick 116 by the reading program 54G.

The content processing routine 152 generates the thumbnail in accordance with the type of the data supplied from the reading program 54G.

To be more specific, if moving image data have been supplied from the reading program 54G, a thumbnail is generated on the basis of the first image of the moving image. For example, again, if a still image of TIFF (Tag Image File Format) or GIF (Graphic Interchange Format) has been supplied, a thumbnail is generated on the basis of the supplied still image. However, if still image data of JPEG (Joint Photographic Experts Group) have been supplied, the thumbnail data stored in the header of the data are used. If voice or text data have been supplied from the reading program 54G for example, a thumbnail is generated on the basis of the contents of the supplied voice or text data.

In the lower portion of the screen displayed by the display program 54F onto the LCD 7, icons for specifying how to arrange the thumbnails are displayed. An icon 202-1 is clicked to instruct the display program 54F to display the thumbnails along a virtual straight line. An icon 202-2 is clicked to instruct the display program 54F to display the thumbnails around a virtual true circle or ellipse. An icon 202-3 is clicked to instruct the display program 54F to display the thumbnails in a latticed manner. An icon 202-4 is clicked to instruct the display program 54F to display the thumbnails along a virtual spiral.

Figure 8:
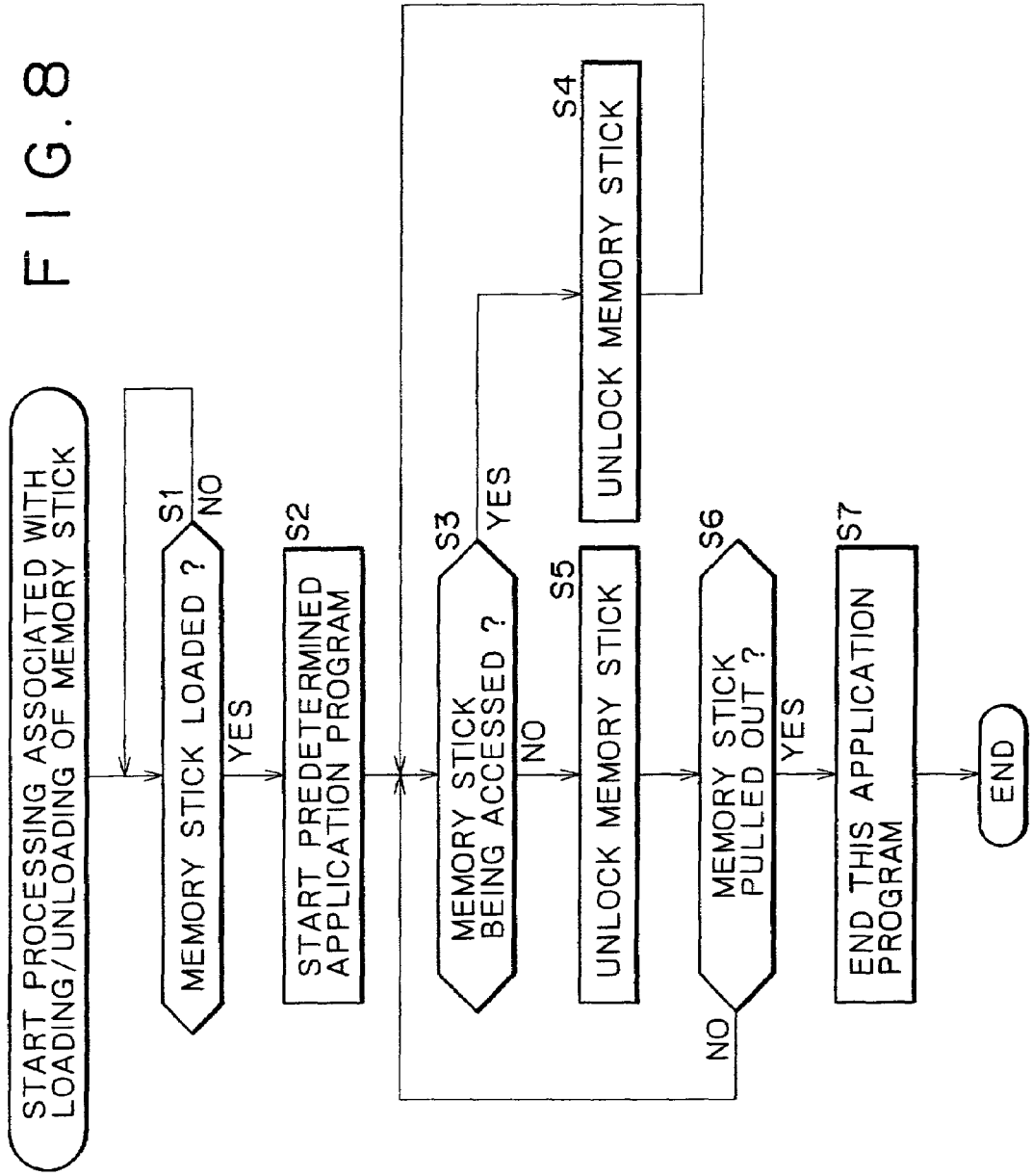
FIG. 8 is a flowchart describing the Memory Stick loading/unloading processing.

The following describes the processes to be executed by the Memory Stick loading/unloading monitor program 54H for starting or ending the display program 54F and the reading program 54G in response to the loading or unloading of the Memory Stick 116 on the Memory Stick slot 115 with reference to the flowchart shown in FIG. 8.

It should be noted that the Memory Stick loading/unloading monitor program 54H for executing the Memory Stick loading/unloading processes is started by the auto pilot program 54B for example.

In step S1, the Memory Stick loading/unloading monitor program 54H determines whether or not the Memory Stick 116 has been loaded in the Memory Stick slot 115 and waits until the Memory Stick 116 is found loaded. If the Memory Stick 116 is found loaded, the procedure goes to step S2. In step S2, the Memory Stick loading/unloading monitor program 54H starts the display program 54F and the reading program 54G.

In step S3, the Memory Stick loading/unloading monitor program 54H determines whether or not the reading program 54G is accessing the Memory Stick 116 (namely whether or not data are being read from the Memory Stick 116). If the Memory Stick 116 is found being accessed, then the procedure goes to step S4.

In step S4, the Memory Stick loading/unloading monitor program 54H locks the Memory Stick 116, upon which the procedure returns to step S3.

The term "lock" denotes an action to be taken to surely keep the Memory Stick 116 in the Memory Stick slot 115. This action may be implement by a hardware or software approach. The locking can prevent the data stored in the Memory Stick 116 from being destroyed and the error of the reading program 54G from occurring due to the pulling out of the Memory Stick 116 being accessed from the Memory Stick slot 115.

If, in step S3, the Memory Stick 116 is found not being accessed by the reading program 54G, then the procedure goes to step S5. In step S5, the Memory Stick loading/unloading monitor program 54H unlocks the Memory Stick 116. Namely, the Memory Stick 116 is put in the state in which the Memory Stick 116 can be pulled out of the Memory Stick slot 115.

In step S6, the Memory Stick loading/unloading monitor program 54H determines whether or not the Memory Stick 116 has been pulled out of the Memory Stick slot 115. If the Memory Stick 116 is found not pulled out, the procedure returns to step S3 to repeat the above-mentioned processes. If, in step S6, the Memory Stick 116 is found pulled out, then the procedure goes to step S7.

In step S7, the Memory Stick loading/unloading monitor program 54H ends the display program 54F and the reading program 54G.

Thus, the Memory Stick loading/unloading processing by the Memory Stick loading/unloading monitor program 54H makes the loading and unloading of the Memory Stick 116 a trigger event for the starting or ending of the display program 54F and the reading program 54G, thereby allowing the user to make intuitive operations for enhanced convenience.

Figure 9:
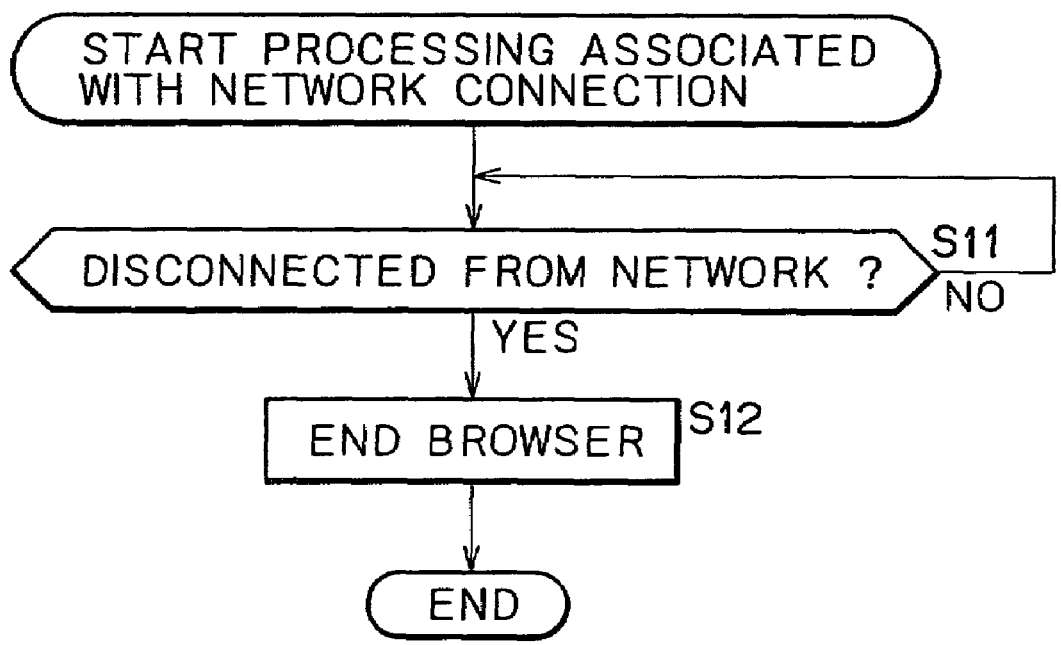
FIG. 9 is a flowchart describing the network connection processing.

The following describes the network connection processing to be executed by the OS 54E with reference to FIG. 9. This network connection processing is started when a connection is established between the application program 54I executing a WWW (World Wide Web) browser and the Internet 80. However, the connection with the Internet 80 is executed by the modem 75 via the telephone line 76 and the Internet service provider 77.

In step S11, the OS 54E determines whether or not the connection with the Internet 80 has been disconnected and waits until determining the disconnection occurs. The cause of the disconnection from the Internet 80 includes a command inputted by the user and a communication error in the telephone line 76 for example.

If the disconnection from the Internet 80 is found, then the procedure goes to step S12. In step S12, the OS 54E ends the WWW browser being executed.

Thus, according to the above-mentioned network connection processing, the WWW browser is ended upon disconnection from the Internet 80, thereby saving the user the trouble of issuing an end command to the WWW browser.

It should be noted that the application program 54I other than the WWW browser may be executed in the same manner as the network connection processing also when the connection with the Internet 80 or another network (for example, LAN (Local Area Network)) has been established.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

The program storage medium for storing computer-readable and executable programs may be a package medium constituted by the magnetic disk 121 (including floppy disk), or the optical disc 122 (including CD-ROM (Compact Disc-Read Only Memory) and DVD (Digital Versatile Disc)), the magneto-optical disk 123 (including MD (Mini Disk)), or the semiconductor memory 124 or a ROM or a hard disk on which the programs are stored temporarily or permanently as shown in FIG. 5. Programs are stored in the program storage medium from wired or wireless communications media such as a local area network, the Internet, and digital satellite broadcasting through the interface such as a router and a modem as required.

It should be noted that the steps describing the programs to be stored in the program storage medium are not only executed in a time-dependent manner in the order described, but also in parallel or in a discrete manner.

It should also be noted that the system as used herein denotes an entire apparatus constituted by a plurality of component units.

While a preferred embodiment of the invention has been described using specific terms, such description is for illustrative purpose only, and it is to be understood that changes and variations may be made without departing from the spirit or scope of the following claims.

What is claimed is:

1. An information processing apparatus for reading data from a detachable predetermined recording medium, comprising:

loading detection means for detecting the loading of a recording medium into said information processing apparatus, wherein said recording medium stores data including one or more images, and each of said one or more images has a type;

starting means for starting, in response to the loading of said recording medium detected by said loading detection means, a resident application program for processing said data stored on said recording medium, wherein said resident application program is already stored in said information processing apparatus before said recording medium is loaded into said information processing apparatus;

unloading detection means for detecting the unloading of said recording medium from said information processing apparatus; and ending means for ending, in response to the unloading of said recording medium detected by said unloading detection means, said resident application program;

wherein said resident application program reads one or more of said one or more images from said recording medium and generates a thumbnail image for said one or more read images according to the type of said one or more read images so that said thumbnail image presents a small image representation specific to said one or more read images, and wherein said one or more read images includes one or more moving images and still images so that said thumbnail image for said one or more moving images is generated from a first image and said thumbnail image for said one or more still images is generated from thumbnail data in a header of said one or more still images.

2. An information processing apparatus according to claim 1, further comprising:

detection means for detecting access to said recording medium; and restriction means for restricting the unloading of said recording medium in response to a detection result provided by said detection means.

3. An information processing apparatus according to claim 1, wherein said recording medium is a semiconductor memory.

4. A method for processing information for an information processing apparatus for reading data from a detachable predetermined recording medium, comprising:

a loading detection step for detecting the loading of a recording medium into said information processing apparatus, wherein said recording medium stores data including one or more images, and each of said one or more images has a type;

a starting step for starting, in response to the loading of said recording medium detected in said loading detection step, a resident application program for processing said data stored on said recording medium, wherein said resident application program is already stored in said information processing apparatus before said recording medium is loaded into said information processing apparatus;

an unloading detection step for detecting the unloading of said recording medium from said information processing apparatus; and an ending step for ending, in response to the unloading of said recording medium detected in said unloading detection step, said resident application program;

wherein said resident application program reads one or more of said one or more images from said recording medium and generates a thumbnail image for said one or more read images according to the type of said one or more read images so that said thumbnail image presents a small image representation specific to said one or more read images, and wherein said one or more read images includes one or more moving images and still images so that said thumbnail image for said one or more moving images is generated from a first image and said thumbnail image for said one or more still images is generated from thumbnail data in a header of said one or more still images.

5. A program storage medium storing a computer-readable program for processing information for reading data from a detachable predetermined recording medium, said program comprising:

a loading detection step for detecting the loading of a recording medium into said information processing apparatus, wherein said recording medium stores data including one or more images, and each of said one or more images has a type;

a starting step for starting, in response to the loading of said recording medium detected in said loading detection step, a resident application program for processing said data stored on said recording medium, wherein said resident application program is already stored in said information processing apparatus before said recording medium is loaded into said information processing apparatus;

an unloading detection step for detecting the unloading of said recording medium; and an ending step for ending, in response to the unloading of said recording medium detected in said unloading detection step, said resident application program;

wherein said resident application program reads one or more of said one or more images from said recording medium and generates a thumbnail image for said one or more read images according to the type of said one or more read images so that said thumbnail image presents a small image representation specific to said one or more read images, and wherein said one or more read images includes one or more moving images and still images so that said thumbnail image for said one or more moving images is generated from a first image and said thumbnail image for said one or more still images is generated from thumbnail data in a header of said one or more still images.

* * * * *